(12) United States Patent
Chen et al.

(10) Patent No.: US 8,829,090 B2
(45) Date of Patent: Sep. 9, 2014

(54) COMPOSITION COMPRISING PROPYLENE-ALPHA-OLEFIN COPOLYMER, OLEFIN BLOCK COPOLYMER AND DPO-BSA MOLECULAR MELT

(75) Inventors: Yong Chen, Changchun (CN); Hong Yang, Shanghai (CN); David Hong Fei Guo, Shanghai (CN); Kim L. Walton, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/885,295

(22) PCT Filed: Nov. 24, 2010

(86) PCT No.: PCT/CN2010/079063
§ 371 (c)(1),
(2), (4) Date: May 14, 2013

(87) PCT Pub. No.: WO2012/068727
PCT Pub. Date: May 31, 2012

(65) Prior Publication Data
US 2013/0237655 A1     Sep. 12, 2013

(51) Int. Cl.
| | |
|---|---|
| *C08K 5/41* | (2006.01) |
| *C08K 5/00* | (2006.01) |
| *C08L 23/14* | (2006.01) |
| *C08L 53/00* | (2006.01) |
| *C08L 23/08* | (2006.01) |
| *D06N 3/04* | (2006.01) |
| *C08K 5/43* | (2006.01) |

(52) U.S. Cl.
CPC ............. *C08L 53/005* (2013.01); *C08L 23/142* (2013.01); *C08L 53/00* (2013.01); *C08K 5/43* (2013.01); *C08L 2312/00* (2013.01); *C08L 23/0815* (2013.01); *D06N 3/045* (2013.01)
USPC .......................................... 524/155; 524/291

(58) Field of Classification Search
CPC ........... C08L 53/005; C08K 5/41; C08K 5/42
USPC ........................................................ 524/155
See application file for complete search history.

(56) References Cited

U.S. PATENT DOCUMENTS

| | | | |
|---|---|---|---|
| 4,789,699 A | 12/1988 | Kieffer et al. | |
| 5,093,422 A | 3/1992 | Himes | |
| 5,272,236 A | 12/1993 | Lai et al. | |
| 5,278,272 A | 1/1994 | Lai et al. | |
| 5,332,613 A | 7/1994 | Taylor et al. | |
| 5,504,172 A | 4/1996 | Imuta et al. | |
| 5,783,638 A | 7/1998 | Lai et al. | |
| 5,986,028 A | 11/1999 | Lai et al. | |
| 6,525,157 B2 | 2/2003 | Cozewith et al. | |
| 6,582,829 B1 | 6/2003 | Quinn et al. | |
| 6,960,635 B2 | 11/2005 | Stevens et al. | |
| 7,199,203 B2 | 4/2007 | Stevens et al. | |
| 7,235,609 B2 | 6/2007 | Dharia et al. | |
| 7,399,808 B2 * | 7/2008 | Walters et al. | 525/333.7 |
| 7,741,408 B2 | 6/2010 | Walther et al. | |
| 8,420,760 B2 | 4/2013 | Hughes et al. | |
| 2004/0087235 A1 | 5/2004 | Morman et al. | |
| 2004/0122408 A1 | 6/2004 | Potnis et al. | |
| 2004/0122409 A1 | 6/2004 | Thomas et al. | |
| 2005/0154136 A1 | 7/2005 | Dharia et al. | |
| 2006/0189759 A1 | 8/2006 | Walther et al. | |
| 2006/0199910 A1 | 9/2006 | Walton et al. | |
| 2010/0048792 A1 * | 2/2010 | Finlayson et al. | 524/427 |
| 2012/0108134 A1 * | 5/2012 | Chee et al. | 442/370 |

FOREIGN PATENT DOCUMENTS

| | | |
|---|---|---|
| EP | 0712892 B1 | 3/2002 |
| WO | 00/01745 | 1/2000 |
| WO | 0183605 | 11/2001 |
| WO | 2004041538 | 5/2004 |
| WO | 2009067337 | 5/2009 |
| WO | 2009/148842 A1 | 12/2009 |
| WO | 2012/034272 A1 | 3/2012 |

OTHER PUBLICATIONS

International Search Report and Written Opinion of PCT/CN2010/079063 mailed Aug. 25, 2011.

* cited by examiner

*Primary Examiner* — Hui Chin
(74) *Attorney, Agent, or Firm* — Whyte Hirschboeck Dudek S.C.

(57) ABSTRACT

Compositions comprising (A) propylene-alpha-olefin copolymer, (B) olefin block copolymer, and (C) DPO-BSA molecular melt (MM) are useful in the preparation of the top skin layer of artificial leather multi-layer structures.

14 Claims, 1 Drawing Sheet

COMPOSITION COMPRISING PROPYLENE-ALPHA-OLEFIN COPOLYMER, OLEFIN BLOCK COPOLYMER AND DPO-BSA MOLECULAR MELT

CROSS REFERENCE TO RELATED APPLICATION

The present application is the national phase of PCT Patent Application No. PCT/CN2010/079063 filed Nov. 24, 2010, the entire content of which is incorporated by reference herein.

BACKGROUND OF THE INVENTION

1. Field of the Invention

This invention relates to artificial leather. In one aspect the invention relates to the top layer of an artificial leather multi-layer laminate while in another aspect, the invention relates to a top layer made from a composition comprising a propylene-alpha-olefin copolymer, an olefin block copolymer and a DPO-BSA molecular melt.

2. Description of the Related Art

Artificial leather is a multi-layer structure or laminate typically comprising a bottom fabric layer and at least one of a top skin layer and a foam layer, typically both a top skin layer and a foam layer with the foam layer sandwiched between the bottom fabric layer and the top skin layer. In some embodiments the multi-layer laminate further comprises a polyurethane (PU) coating layer that is adhered to the top layer with a chlorinated polypropylene (PP) primer.

The problem for the typical incumbent top layer formulation is that it comprises 20-50 wt % styrene/ethylene-butylene/styrene (SEBS) so as to achieve the required balance of softness/flexibility, tensile strength and bonding strength with the PU coating. Specifically, for some application(s), like fashion bags, more than 50 wt % of SEBS is necessary to achieve the softness/flexibility (Shore A of about 50 to 60). The addition of SEBS significantly increases the cost of the finished product which, in turn, hinders the successful commercialization of the product. Moreover, for some applications like furniture leather, abrasion resistance is a stringent requirement.

The artificial leather industry has a continuing interest in the development of low cost, top layer formulations for polyolefin-based applications, especially for fashion bags. These new formulations should achieve the required balance of the softness/flexibility, tensile strength, bonding strength, abrasion resistance, etc., without sacrificing processability during the manufacturing steps, e.g., compounding, calendaring and lamination.

SUMMARY OF THE INVENTION

In one embodiment the invention is a composition comprising (A) propylene-alpha-olefin copolymer, (B) olefin block copolymer, and (C) DPO-BSA molecular melt (MM).

In one embodiment the invention is a top layer of an artificial leather multi-layer structure, the top layer made from a composition comprising (A) propylene-alpha-olefin copolymer, (B) olefin block copolymer, and (C) DPO-BSA molecular melt (MM).

In one embodiment the invention is an artificial leather multi-layer structure comprising a top layer made from a composition comprising (A) propylene-alpha-olefin copolymer, (B) olefin block copolymer, and (C) DPO-BSA molecular melt (MM).

In one embodiment the invention is an article comprising an artificial leather multi-layer structure comprising a top layer made from a composition comprising (A) propylene-alpha-olefin copolymer, (B) olefin block copolymer, and (C) DPO-BSA molecular melt (MM).

In one embodiment the invention is a process for making a composition, the process comprising the steps of:
  A. Dry blending (1) a DPO-BSA molecular melt (MM), (2) a propylene-alpha-olefin copolymer, (3) an olefin block copolymer (OBC), and (4) optional ingredients;
  B. Compounding the dry blend of (A) under a temperature, e.g., 130-150° C., at which the propylene-alpha-olefin copolymer and OBC are melted but the MM is not activated, and
  C. Activating the MM, e.g., by increasing the temperature of the compounded blend of (B) to 180° C. or more, so as to initiate coupling/crosslinking of the propylene-ethylene copolymer and OBC.

In one embodiment the compounding is conducted in an internal mixer. In one embodiment the compounding is conducted in an extruder, and the compounding and extrusion are performed before the molecular melt is activated. In this embodiment the molecular melt is activated after extrusion by exposing the extruded composition to a higher temperature, e.g., during the foaming step if the extruded composition is subjected to foaming.

The DPO-BSA molecular melt (MM) is a coupling agent that is triggered at certain temperatures to generate the coupling/crosslinking of the propylene-alpha-olefin copolymer and OBC effectively. The inventive composition typically comprises at least 300 ppm DPO-BSA, which improves the tensile strength, tear strength, and abrasion resistance of the product with acceptable softness/flexibility and bonding strength relative to a product alike in all other respects except for the presence of the DPO-BSA MM. The inventive formulation/process offers a cost effective composition without any significant adverse effect on the processability of the composition during the compounding, calendaring, and lamination processes involved in making artificial leather products.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, thickness, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of ingredients in the top layer composition, layer thicknesses, process temperature ranges, and the like.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" and like terms means a polymer prepared by the polymerization of at least two different types of monomers. Interpolymer refers both to polymers prepared from two different types of monomers, and polymers prepared from more than two different types of monomers, e.g., copolymers, terpolymers, tetrapolymers, etc.

"Layer" and like terms mean a single thickness or coating of a compound, polymer or composition spread out or covering a surface.

"Multi-layer structure" and similar terms mean a structure that comprises two or more layers. The multi-layer structures of this invention comprise a bottom fabric layer and at least one of a top skin layer and a foam layer, typically both a top skin layer and a foam layer with the foam layer sandwiched between the bottom fabric layer and the top skin layer. Optionally and typically the multi-layer structure also comprises at least one of a primer layer and a top coating layer with the primer layer sandwiched between the skin layer and the top coating layer. Each layer comprises top and bottom facial surfaces, and typically and preferably the bottom facial surface of the top coating layer is in contact with the top facial surface of the middle foam layer, and the bottom facial surface of the middle foam layer is in contact with the top facial surface of the bottom fabric layer. If the optional primer and top coating layers are present, then the bottom facial surface of the primer layer is in contact with the top facial surface of the top skin layer, and the top facial surface of the primer layer is in contact with the bottom facial surface of the top coating layer. "In contact" means that an intervening layer, e.g., an adhesive layer, does not exist between the two facial surfaces.

"Planar surface", "facial surface", "top surface", "bottom surface" and like terms are used in distinction to "edge surface". If rectangular in shape or configuration, a layer will comprise two opposing planar surfaces joined by four edge surfaces (two opposing pairs of edge surfaces, each pair intersecting the other pair at right angles). If circular in configuration, then the layer will comprise two opposing planar surfaces joined by one continuous edge surface. The multi-layer structure can be of any size and shape and as such, so can the planar and edge surfaces, e.g., thin or thick, polygonal or circular, flat or wavy, etc.

"Calendering" and like terms mean, in the context of this invention, a mechanical process in which a molten polymer is converted into a sheet by passing the molten polymer through a series of rollers to coalesce, flatten and smooth the polymer into a sheet or film.

"Laminating" and like terms mean a process in which a film, typically of plastic or like material, is applied to a substrate which can be another film. The film can be applied to the substrate with or without an adhesive. If without an adhesive, the film and/or substrate can be heated to effect heat or melt lamination. Laminations are products of a laminating process, and these products are multilayered, i.e., they comprise at least two layers, a film layer in contact with a base or substrate layer.

"Nonwoven fabric" and like terms mean a fabric or like material that is made from long fibers, bonded together by chemical, mechanical, heat or solvent treatment. The term is used to denote fabrics, like felt, than are neither woven nor knitted.

"Spunbond fabric" and like terms mean a fabric or like material that is made by depositing extruded, spun filaments onto a collecting belt in a uniform, random manner followed by bonding of the fibers.

"Foam" and like terms mean a substance that is formed by trapping many gas bubbles in a liquid or solid.

"Antioxidant" refers to types or classes of chemical compounds that are capable of being used to minimize the oxidation that can occur during the processing of polymers. The term also includes chemical derivatives of the antioxidants, including hydrocarbyls. The term further includes chemical compounds, as described later in the description of the antioxidant, that when properly combined with the coupling agent (modifying agent) interact with to form a complex which exhibits a modified Raman spectra compared to the coupling agent or modifying agent alone.

"Modifying agent" refers to a chemical compound that contains a reactive group capable of forming a carbene or a nitrene group that can react with a polymer chain.

"Nitrene group" refers to a compound having a structure R—N, where N is nitrogen capable of reacting with a polymer chain by inserting into the carbon hydrogen bonds of CH, CH2, or CH3 groups, both aliphatic and/or aromatic, of a polymer chain. The nitrogen most preferred for inserting into the carbon hydrogen bonds is believed to have two lone pairs of electrons. R may be any atom or atoms that do not adversely interfere with the nitrogen inserting into the above-described carbon hydrogen bonds.

"Carbene group" refers to a compound having a structure R—C—R' where C is carbon capable of reacting with a polymer chain by inserting into the carbon hydrogen bonds of CH, CH2 or CH3 groups, both aliphatic and/or aromatic, of a polymer chain. The carbon most preferred for inserting into the carbon hydrogen bonds is believed to have one lone pair of electrons. R and R' are independently any atom or atoms that do not adversely interfere with the carbon inserting into the above-described carbon hydrogen bonds.

Multi-Layer Structure

Figure 1A:
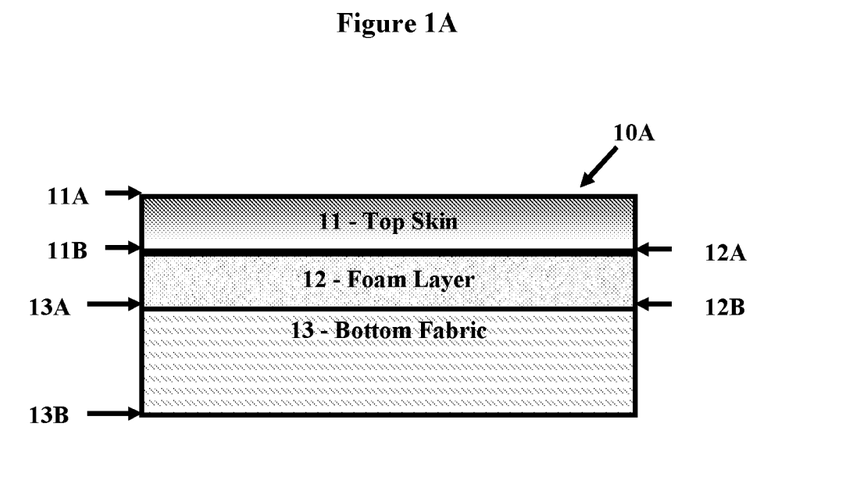
FIG. 1A is a schematic illustration of a cross-section of one embodiment of a three-layer structure or laminate artificial leather.

FIG. 1A is a schematic of three-layer structure 10A in which top skin layer 11 is over and in contact with middle foam layer 12 which is over and in contact with bottom fabric layer 13. Each layer comprises two opposing facial surfaces, top facial surface 11a and bottom facial surface 11b of top skin layer 11, top facial surface 12a and bottom facial surface 12b of middle foam layer 12, and top facial surface 13a and bottom facial surface 13b of bottom fabric layer 13. Bottom facial surface 11b is in contact with top facial surface 12a, and bottom facial surface 12b is in contact with top facial surface 13a. Top facial surface 11a and bottom facial surface 13b are open (i.e., exposed) to the environment or, optionally, in contact with the surface of another structure. The thickness of each layer can vary to convenience as can the total thickness of the structure. Typically the thickness of the top skin layer is 0.05 to 3, more typically 0.08 to 2 and even more typically 0.1 to 1, millimeters (mm), the thickness of the middle foam layer is 0.05 to 3, more typically 0.08 to 2.5 and even more typically 0.1 to 2, mm, and the thickness of the bottom fabric layer is 0.5 to 3, more typically 0.08 to 2.5 and even more typically 0.1 to 2, mm. The thickness of the total structure is typically of 0.15 to 9, more typically of 0.24 to 7 and even more typically of 0.3 to 5, mm.

Figure 1B:
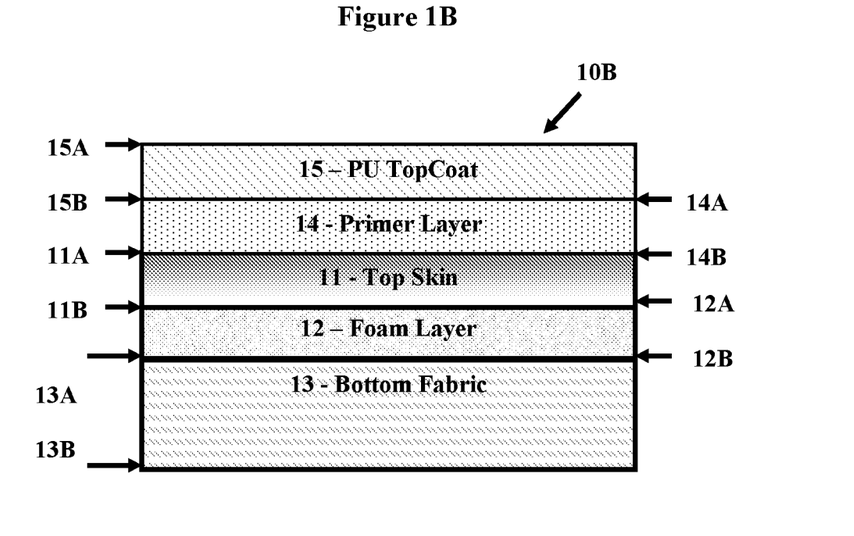
FIG. 1B is a schematic illustration of a cross-section of one embodiment of a five-layer structure or laminate artificial leather.

FIG. 1B is a schematic of five-layer structure 10B in which optional primer layer 14 is over and in contact with top skin layer 11 of three-layer structure 10A, and optional top coating layer 15 is over and in contact with primer layer 14. Each optional layer comprises two opposing facial surfaces, top facial surface 15a and bottom facial surface 15b of optional top coating layer 15, and top facial surface 14a and bottom facial surface 14b of optional primer layer 14. Bottom facial surface 15b is in contact with top facial surface 14a, and bottom facial surface 14b is in contact with top facial surface 11a. In this embodiment, top facial surface 15a and bottom facial surface 13b are exposed to the environment or, optionally, in contact with a facial surface of another structure. The thickness of each optional layer can vary to convenience, with the thickness of the optional top coating layer typically of 0.1 to 100, more typically 1 to 50 and even more typically 3 to 10, microns (μm), and the thickness of the optional primer layer typically of 0.1 to 100, more typically 1 to 50 and even more typically 3 to 10, μm. Here too, the thickness of a typical 3-layer structure can vary widely, but it is typically of 0.15 to 9, more typically of 0.24 to 7 and even more typically of 0.3 to 5, mm (the optional top coating and primer layers adding little to the thickness of the total (5-layer) structure). The thickness of the top coating layer is typically less than the thickness of the top skin layer.

The multi-layer structures of this invention are typically made by laminating one layer to another in any order, i.e., the top skin layer laminated to the bottom fabric layer, or the foam layer laminated to the bottom fabric layer optionally followed by the top skin layer laminated to the foam layer, or the top skin layer laminated to middle foam layer followed by the bottom fabric layer laminated to the middle foam layer, or the top skin layer and the bottom fabric layer are laminated to the middle foam layer at the same time. If the multilayer structure also comprises the optional primer and top coating layers, these are usually, but not necessarily, applied after the top skin, middle foam and bottom fabric layers are laminated to one another. Typically the primer layer is roll-coated to the top facial surface of the top skin layer followed by the coating of the top coating to the primer layer. The multi-layer structures, e.g., structures 10A, and 10B in FIGS. 1A and 1B, respectively, are non-adhesive structures or in other words, they do not contain an adhesive layer between any of the layers, i.e., no adhesive between and in contact with the foam layer and the top skin layer, or between and in contact with the foam layer and the bottom fabric layer, or between and in contact with the top skin layer and the bottom fabric layer.

Top Skin Layer

The top skin layer (layer 11 in FIGS. 1A and 1B) is made from a composition that comprises (A) propylene-alpha-olefin interpolymer, preferably a propylene-ethylene copolymer, (B) olefin block copolymer (OBC), and (C) DPO-BSA molecular melt (MM). Optionally, the composition from which the top skin layer is made can also comprise at least one of (D) a styrenic block interpolymer, (E) a homogeneously branched ethylene/alpha-olefin interpolymer, and (F) a random polypropylene interpolymer. The top skin layer can comprise a single propylene/alpha-olefin interpolymer or a blend of two or more propylene/alpha-olefin interpolymers. Likewise, each of the olefin block copolymers and the optional interpolymers can be present neat or as a blend of two or more interpolymers. The top skin layer can also comprise one or more optional additives such as processing aids, extenders, blocking agents, pigments and/or dyes, antioxidants, UV-stabilizers or absorbers, flame retardants, fillers (such as talc, calcium carbonate), and the like.

The top skin layer typically comprises at least 10, more typically at least 20 and even more typically at least 30, weight percent (wt %) propylene/alpha-olefin interpolymer. The maximum amount of propylene/alpha-olefin interpolymer in the top coating layer typically does not exceed 90, more typically does not exceed 80 and even more typically does not exceed 70, wt %.

The top skin layer typically comprises at least 10, more typically at least 20 and even more typically at least 30, wt % OBC. The maximum amount of OBC in the top coating layer typically does not exceed 90, more typically does not exceed 80 and even more typically does not exceed 70, wt %.

The total amount of (D) styrenic block interpolymer, (E) homogeneously branched, linear ethylene/alpha-olefin interpolymer, and (F) random polypropylene interpolymer in the top skin layer, if present, typically is at least 10, more typically at least 20 and even more typically at least 30, wt %. The maximum total amount of (D) styrenic block copolymer, (E) homogeneously branched ethylene/alpha-olefin copolymer, and (F) random polypropylene copolymer in the top skin layer, if present, typically does not exceed 60, more typically does not exceed 30 and even more typically does not exceed 20, wt %.

If present at all, the total amount of optional additives present in the top skin layer typically is greater than zero, more typically at least 1 and even more typically at least 2, parts per hundred resin (phr). If present at all, the total amount of optional additives in the top skin layer typically does not exceed 15, more typically does not exceed 10 and even more typically does not exceed 5, phr.

If present at all, the total amount of optional fillers present in the top skin layer typically is greater than zero, more typically at least 3 and even more typically at least 10, weight percent (wt %). If present at all, the total amount of optional additives in the top skin layer typically does not exceed 60, more typically does not exceed 40 and even more typically does not exceed 20, wt %.

Propylene-Alpha-Olefin Interpolymer

One of the base polymers of the compositions from which the top skin is made is a propylene/alpha-olefin interpolymer, typically and preferably a propylene-alpha-olefin copolymer, which is characterized as having substantially isotactic propylene sequences. "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

The propylene/alpha-olefin interpolymer may have a melt flow rate in the range of from 0.1 to 500 grams per 10 minutes (g/10 min), measured in accordance with ASTM D-1238 (at 230° C./2.16 Kg). All individual values and subranges from 0.1 to 500 g/10 min are included herein and disclosed herein; for example, the melt flow rate can be from a lower limit of 0.1 g/10 min, 0.2 g/10 min, or 0.5 g/10 min to an upper limit of 500 g/10 min, 200 g/10 min, 100 g/10 min, or 25 g/10 min. For example, the propylene/alpha-olefin copolymer may have a melt flow rate in the range of from 0.1 to 200 g/10 min; or in the alternative, the propylene/alpha-olefin copolymer may have a melt flow rate in the range of from 0.2 to 100 g/10 min; or in the alternative, the propylene/alpha-olefin copolymer may have a melt flow rate in the range of from 0.2 to 50 g/10 min; or in the alternative, the propylene/alpha-olefin copolymer may have a melt flow rate in the range of from 0.5 to 50 g/10 min; or in the alternative, the propylene/alpha-olefin copolymer may have a melt flow rate in the range of from 1 to 50 g/10 min; or in the alternative, the propylene/alpha-olefin copolymer may have a melt flow rate in the range of from 1 to 40 g/10 min; or in the alternative, the propylene/alpha-olefin interpolymer may have a melt flow rate in the range of from 1 to 30 g/10 min.

The propylene/alpha-olefin interpolymer has crystallinity in the range of from at least 1 percent by weight (a heat of fusion (Hf) of at least 2 Joules/gram (J/g)) to 30 percent by weight (a Hf of less than 50 J/g). All individual values and subranges from 1 percent by weight (a Hf of at least 2 J/g) to 30 percent by weight (a Hf of less than 50 J/g) are included herein and disclosed herein; for example, the crystallinity can be from a lower limit of 1 percent by weight (a Hf of at least 2 J/g), 2.5 percent (a Hf of at least 4 J/g), or 3 percent (a Hf of at least 5 J/g) to an upper limit of 30 percent by weight (a Hf of less than 50 J/g), 24 percent by weight (a Hf of less than 40 J/g), 15 percent by weight (a Hf of less than 24.8 J/g) or 7 percent by weight (a Hf of less than 11 J/g). For example, the propylene/alpha-olefin copolymer may have a crystallinity in the range of from at least 1 percent by weight (a Hf of at least 2 J/g) to 24 percent by weight (a Hf of less than 40 J/g); or in the alternative, the propylene/alpha-olefin copolymer may have a crystallinity in the range of from at least 1 percent by weight (a Hf of at least 2 J/g to 15 percent by weight (a Hf of less than 24.8 J/g); or in the alternative, the propylene/alpha-olefin copolymer may have a crystallinity in the range of from at least 1 percent by weight (a Hf of at least 2 J/g) to 7 percent by weight (a Hf of less than 11 J/g); or in the alternative, the propylene/alpha-olefin copolymer may have a crystallinity in the range of Hf of less than 8.3 J/g). The crystallinity is measured by differential scanning calorimetry (DSC) as described in U.S. Pat. No. 7,199,203. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$ and $C_4$ to $C_{10}$ alpha-olefins; for example, $C_2$, $C_4$, $C_6$ and $C_8$ alpha-olefins.

The propylene/alpha-olefin interpolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin interpolymer has a melting temperature (Tm) typically of less than 120° C. and a heat of fusion (Hf) typically of less than 70 Joules per gram (J/g) as measured by differential scanning calorimetry (DSC) as described in U.S. Pat. No. 7,199,203.

The propylene/alpha-olefin interpolymer has a molecular weight distribution (MWD), defined as weight average molecular weight divided by number average molecular weight ($M_w/M_n$) of 3.5 or less; or 3.0 or less; or from 1.8 to 3.0.

Such propylene/alpha-olefin interpolymers are further described in the U.S. Pat. Nos. 6,960,635 and 6,525,157. Such propylene/alpha-olefin interpolymers are commercially available from The Dow Chemical Company, under the trade name VERSIFY, or from ExxonMobil Chemical Company, under the trade name VISTAMAXX.

In one embodiment, the propylene/alpha-olefin interpolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082599.

Olefin Block Copolymer (OBC)

The olefin block copolymers that can be used in the practice of this invention are multi-block or segmented copolymers. These are polymers comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1.0 to about 2.9; from about 1.3 to about 2.5 in other embodiments; from about 1.4 to about 2.0 in other embodiments; and from about 1.4 to about 1.8 in yet other embodiments.

Ethylene/α-olefin multi-block interpolymers comprise ethylene and one or more co-polymerizable α-olefin comonomers in polymerized form, characterized by multiple (i.e., two or more) blocks or segments of two or more polymerized monomer units differing in chemical or physical properties (block interpolymer), preferably a multi-block interpolymer. In some embodiments, the multi-block interpolymer may be represented by the following formula:

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

The melt index of the OBC can range broadly, but it is typically from 0.5 to 10 g/10 minutes at 190° C. and 2.16 Kg and measured by ASTM D1238. Such ethylene/alpha-olefin block interpolymers are commercially available from The Dow Chemical Company under the trade name INFUSE.

DPO-BSA Molecular Melt (MM)

DPO-BSA molecular melts and methods for their preparation are known (see, for example, WO 2001/083605 and U.S. Pat. No. 7,399,808). DPO-BSA means 4,4'-oxydibenzenesulfonyl azide. Molecular melt (MM) and like terms refers to an at least partially amorphous blend, at room temperature, of a coupling agent (modifying agent) and an antioxidant, optionally also containing other polymer additives. Both the coupling agent (modifying agent) and the antioxidant are at least partially contained in the amorphous phase of the blend. Also, preferably the coupling agent (modifying agent) and the antioxidant form a complex where the Raman spectra relating to the groups forming the nitrene groups are shifted compared to the Raman spectra exhibited by the groups forming the nitrene groups of the coupling agent alone (see WO 2001/083605 and U.S. Pat. No. 7,399,808).

The mole ratio of coupling agent to antioxidant in the molecular melt is typically from 1:10 to 10:1, preferably from 1:8 to 8:1, more preferably from 1:4 to 4:1. The overall crystallinity of the molecular melt is typically related to the mole ratio of coupling agent to antioxidant. In most instances the ratio of coupling agent to antioxidant in the molecular melt is adjusted to provide a molecular melt having a total crystallinity of 99 weighted average weight percent or below (as determined by differential scanning calorimetry (DSC) and calculated as set forth in Example 2 of WO 2001/083605), more preferably less than 95 weighted average weight percent, further more preferably less than 60 weighted average weight percent, most preferably less than 40 weighted average weight percent. In some instances, those in which a particular concern regarding the shock sensitivity of the molecular melt is of concern, the molecular melt has a crystallinity of 20 weighted average weight percent or below, more preferably 10 weighted average weight percent or below, further more preferably 5 weighted average weight percent of below, most preferably 1 weighted average weight percent or below as determined by DSC. For a molecular melt comprised of 4,4'-oxydibenzenesulfonylazide and tetrakis [Methylene (3,5-di-t-butyl-4hydroxyhydrocinnamate)], the molar ratio of coupling agent to antioxidant is preferably between 1:2 and 4:1. In some instances, low melting polymer additives such as polyethylene glycol and/or polypropylene glycol may be included in the molecular melt.

Other compounds, in addition to the coupling agent and antioxidant, may optionally be present in the molecular melt. Preferably, the additional compounds will not adversely react with either the coupling agent or the antioxidant and will not cause the crystallinity of the molecular melt to rise significantly. However, in some instances, for example, where blocking of the molecular melt is a concern, it may be desirable to add additional compounds which will increase the resulting crystallinity of the molecular melt. Low melting materials, such as polyethylene glycol and polypropylene glycol, may optionally be included in the molecular melt to lower the shock-sensitivity and/or crystallinity of the molecular melt. Preferably the molecular melt does not contain any phosphite based compounds (such as phosphite based antioxidants) as these phosphite based compounds are believed to adversely react with the coupling agent in the molecular melt (although compounds containing phosphorous in the +3 oxidation state may be added to the molecular melt in limited quantities that do not adversely react with the coupling agent or modifying agent). In general the additional compounds added to the molecular melt should be polymer additives that are typically added during the polymerization process or polymer processing process.

The molecular melt may be formed into any convenient form, solid or liquid. The molecular melt will typically be formed into particles that can be used in a process for modifying polymers, such as polyolefins. It is generally important to ensure that the coupling agents are properly dispersed in the target polymer prior to or during reaction. The average diameter of the particles of molecular melt is preferably 3000 microns or less, more preferably 2000 microns or less. For ease of processing and handling, the particles preferably have an average diameter of at least 200 microns.

The molecular melt may be formed by melt blending the coupling agent and antioxidant, by co-precipitating the coupling agent and antioxidant from a common solvent, or any other method that will provide an at least partially amorphous molecular melt.

Optional Polymers

Styrenic Block Copolymer

Examples of styrenic block copolymers suitable for use in the invention are described in EP 0 712 892 B1, WO 2004/041538 A1, U.S. Pat. No. 6,582,829B1, US2004/0087235 A1, US2004/0122408 A1, US2004/0122409A1, and U.S. Pat. Nos. 4,789,699, 5,093,422 and 5,332,613.

In general, hydrogenated styrenic block copolymers suitable for use in the invention have at least two mono-alkenyl arene blocks, preferably two polystyrene blocks, separated by a block of saturated conjugated diene comprising less than 20% residual ethylenic unsaturation, preferably a saturated polybutadiene block. The preferred styrenic block copolymers have a linear structure although in some embodiments, branched or radial polymers or functionalized block copolymers make useful compounds (amine-functionalized styrenic block copolymers are generally disfavored in the manufacture of the artificial leather of this invention).

Typically, polystyrene-saturated polybutadiene-polystyrene and polystyrene-saturated polyisoprene-polystyrene block copolymers comprise polystyrene end-blocks having a number average molecular weight from 5,000 to 35,000 and saturated polybutadiene or saturated polyisoprene mid-blocks having a number average molecular weight from 20,000 to 170,000. The saturated polybutadiene blocks preferably have from 35-55% 1,2-configuration and the saturated polyisoprene blocks preferably have greater than 85% 1,4-configuration.

The total number average molecular weight of the styrenic block copolymer is preferably from 30,000 to 250,000 if the copolymer has a linear structure. Such block copolymers typically have an average polystyrene content from 10% by weight to 65%, more typically from 10% by weight to 40% by weight.

SEBS (S is styrene, E is ethylene and B is butylene) and SEPS (P is propylene) block copolymers useful in certain embodiments of the present invention are available from Kraton Polymers, Asahi Kasei and Kuraray America.

Homogeneously Branched Ethylene/Alpha-Olefin Copolymer

The homogeneously branched ethylene/alpha-olefin copolymers useful in the practice of this invention are made with a single-site catalyst such as a metallocene catalyst or constrained geometry catalyst, and typically have a melting point of less than 105, preferably less than 90, more preferably less than 85, even more preferably less than 80 and still more preferably less than 75, C. The melting point is measured by differential scanning calorimetry (DSC) as described, for example, in U.S. Pat. No. 5,783,638. Such ethylene/α-olefin copolymers with a low melting point often exhibit desirable flexibility and thermoplastic properties useful in the fabrication of the artificial leather of this invention.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above.

Similarly, styrene and its related olefins (for example, α-methylstyrene, etc.) are α-olefins for purposes of this invention. Illustrative homogeneously branched ethylene/alpha-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

More specific examples of homogeneously branched ethylene/alpha-olefin interpolymers useful in this invention include homogeneously branched, linear ethylene/α-olefin copolymers (e.g. TAFMER® by Mitsui Petrochemicals Company Limited and EXACT® by Exxon Chemical Company), and the homogeneously branched, substantially linear ethylene/α-olefin polymers (e.g., AFFINITY™ and ENGAGE™ polyethylene available from The Dow Chemical Company). The substantially linear ethylene copolymers are especially preferred, and are more fully described in U.S. Pat. Nos. 5,272,236, 5,278,272 and 5,986,028. Blends of any of these interpolymers can also be used in the practice of this invention. In the context of this invention, homogeneously branched ethylene/alpha-olefin interpolymers are not olefin block copolymers.

Random Polypropylene Copolymer

The random propylene polymers typically comprise 90 or more mole percent units derived from propylene. The remainder of the units in the propylene copolymer is derived from units of at least one α-olefin. In the context of this invention, random polypropylene copolymers are not propylene/alpha-olefin interpolymers.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a melting temperature ($T_m$) as determined by differential scanning calorimetry (DSC) that is greater than the $T_m$ of the propylene/alpha-olefin copolymer. One acceptable DSC procedure for determining the melting temperature of the random polypropylene copolymer and propylene/alpha-olefin copolymer is that described in U.S. Pat. No. 7,199,203. In one embodiment the random polypropylene copolymer has a Tm greater than 120° C., and/or a heat of fusion greater than 70 J/g (both measured by DSC) and preferably, but not necessarily, made via Ziegler-Natta catalysis.

Foam Layer

The foam or middle foam layer (layer 12 in FIGS. 1A and 1B) typically also comprises a propylene/alpha-olefin copolymer, preferably a propylene/ethylene copolymer, and at least one of (i) a styrenic block copolymer, (ii) a homogeneously branched ethylene/alpha-olefin copolymer, (iii) an olefin block copolymer, and (iv) a random polypropylene copolymer. In certain embodiments the middle foam layer comprises a propylene/alpha-olefin copolymer and at least two, three or all four of components (i)-(iv). The middle foam layer can comprise a single propylene/alpha-olefin copolymer or a blend of two or more propylene/alpha-olefin copolymers. Likewise, each of the (i) a styrenic block copolymer, (ii) a homogeneously branched ethylene/alpha-olefin copolymer, (iii) an olefin block copolymer, and (iv) a random polypropylene copolymer can be present neat or as a blend of two or more copolymers. The middle foam layer will also comprise the gas from the decomposed blowing agent and any unreacted, residual blowing agent. The middle foam layer can also comprise one or more optional additives such as processing aids, extenders, blocking agents, pigments and/or dyes, antioxidants, UV-stabilizers and/or absorbers, flame retardants, fillers (such as talc, calcium carbonate), and the like.

The middle foam layer typically comprises at least 30, more typically at least 40 and even more typically at least 50, weight percent (wt %) propylene/alpha-olefin copolymer. The maximum amount of propylene/alpha-olefin copolymer in the middle foam layer typically does not exceed 90, more typically does not exceed 80 and even more typically does not exceed 70, wt %. The middle foam layer can be compositionally the same as the top skin layer save for the gas and by-products attributable to the foaming process.

The total amount of (i) styrenic block copolymer, (ii) homogeneously branched, linear ethylene/alpha-olefin copolymer, (iii) olefin block copolymer, and (iv) random polypropylene copolymer in the middle foam layer typically is at least 10, more typically at least 20 and even more typically at least 30, wt %. The maximum total amount of (i) styrenic block copolymer, (ii) homogeneously branched ethylene/alpha-olefin copolymer, (iii) olefin block copolymer, and (iv) random polypropylene copolymer in the middle foam layer typically does not exceed 70, more typically does not exceed 60 and even more typically does not exceed 50, wt %.

Generally, the blowing agent is incorporated into the resin composition which is to be foamed in amounts ranging from 0.1 to 30, preferably 1 to 20 and more preferably 2 to 10, phr. The blowing agent typically is incorporated into the melt stream under a pressure which is sufficient to inhibit its activation, that is, to inhibit foaming of the melt stream during the incorporation of the blowing agent and subsequent processing of the composition until the stream is ready to be foamed.

If present at all, the total amount of optional additives present in the foam layer typically is greater than zero, more typically at least 1 and even more typically at least 2, phr. If present at all, the total amount of optional additives in the foam layer typically does not exceed 10, more typically does not exceed 7 and even more typically does not exceed 5, phr.

If present at all, the total amount of optional filler present in the foam layer typically is greater than zero, more typically at least 5 and even more typically at least 10, weight percent (wt %). If present at all, the total amount of optional fillers in the foam layer typically does not exceed 60, more typically does not exceed 40 and even more typically does not exceed 20, wt %.

The foam layer is typically prepared by blending or compounding the individual components with one another in any conventional mixing apparatus, e.g., Banbury kneader or any suitable extruder, under conditions and for a time that produces an at least substantially homogeneous mixture, calendering the mixture using conventional equipment and conditions to form a sheet, and then heat laminating the sheet to the top coating and/or bottom fabric layers using conventional lamination equipment and conditions. The foam layer is typically not subjected to foaming conditions until after it is laminated to at least one of the top coating and bottom fabric layers, preferably not until it is laminated to both layers (if a three- or more layer structure). The foaming conditions are such that very fine and regular cells are formed throughout the layer. Typical foaming conditions include an oven temperature of 220° C. or more and an oven residence time of 30-120 seconds. The foam efficiency [i.e., the ratio of expanded volume to original (non-expanded) volume] is based on the thickness ratio, and it is typically 50 to 350, more typically 150 to 250, percent. The sheets typically exhibit a tensile strength of 5-90 kilograms of force per square centimeter (kgf/cm2), an elongation of 100-1000%, and tear strength of 5-50 kgf/cm.

Bottom Fabric Layer

The bottom fabric layer comprises a flexible, polymeric material which can be woven, nonwoven, knitted, plained, spunbond, etc., and it can comprise natural and/or synthetic fiber. In one embodiment, the fabric layer is a nonwoven, polymeric, spunbond material of a weight of 100-500, more typically of 150-400 and even more typically of 200-350, grams per square meter ($g/m^2$). Fabrics that can be used in the practice of this invention include, but are not limited to, cotton, silk and various synthetics based on polyolefins (e.g., polyethylene, polypropylene, etc.), nylon, polyester, polyurethane (e.g., a spandex material), and the like. In one embodiment, the preferred fabric is prepared from polyester, polyethylene or polypropylene. The fabric can be subjected to a pre-lamination treatment, e.g., corona surface treatment, impregnation, etc., or not, and the foam or top skin layer is ultimately heat laminated to it.

Blowing Agent

Most any of the known blowing agents (also known as foaming or expansion agents) can be employed, including gaseous materials, volatile liquids and chemical agents which decompose into a gas and other byproducts. Representative blowing agents include, without limitation, nitrogen, carbon dioxide, air, methyl chloride, ethyl chloride, pentane, isopentane, perfluoromethane, chlorotrifluoromethane, dichlorodifluoromethane, trichlorofluoromethane, perfluoroethane, 1-chloro-1,1-difluoroethane, chloropentafluoroethane, dichlorotetrafluoro ethane, trichlorotrifluoroethane, perfluoropropane, chloroheptafluoropropane, dichlorohexafluoropropane, perfluorobutane, chlorononafluorobutane, perfluorocyclobutane, azodicarbonamide (ADCA), azodiisobutyronitrile, benzenesulfonhydrazide, 4,4-oxybenzene sulfonyl-semicarbazide, p-toluene sulfonyl semicarbazide, barium azodicarboxylate, N,N'dimethyl-N,N'-dinitrosoterephthalamide, and trihydrazino triazine. Currently, ADCA is a preferred blowing agent.

Additives

The top skin and middle foam layers may contain additives including but not limited to antioxidants, curing agents, cross linking co-agents, boosters and retardants, processing aids, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from 0.01 wt % or less to 10 wt % or more based on the weight of the composition.

In one embodiment the composition comprises from greater than 0 to 40, or from greater than 0 to 30, or from greater than 0 to 20, wt % of paraffin oil. In one embodiment the composition comprises greater than 0 to 2, or from 0.1 to 2, or from greater than 0 to 0.1, wt % of each of, or a combination of, a processing aid (e.g., a stearate), an antioxidant and a UV stabilizer. In one embodiment the composition comprises paraffin oil in combination with one or more of a processing aid, antioxidant and UV stabilizer.

Fillers

Examples of fillers include but are not limited to clays, precipitated silica and silicates, fumed silica, calcium carbonate, ground minerals, carbon blacks with arithmetic mean particle sizes larger than 10 nanometers, and the various known flame retardants, particularly halogen-free flame retardants. Fillers can be used in amounts ranging from greater than zero to 50 wt % or more based on the weight of the layer or total composition. In one embodiment the composition comprises from greater than 0 to 30, or from greater than 0 to 20, or from greater than 0 to 10, wt % filler (typically one or more of talc, calcium carbonate or titanium dioxide). In one embodiment the composition comprises a filler in combination with one or more of paraffin oil, a processing aid, antioxidant and UV stabilizer.

Calendering Process

The multi-layer structures of the present invention can be manufactured using the same conventional calendaring and lamination processes used for PVC-based leathers, and this is an advantage in terms of facility investment. Propylene-ethylene based resins can easily be used in this process because their stickiness against the roll surface is little as compared to other ethylene/propylene-based copolymers. Inherently, the glass transition temperature of propylene-ethylene copolymer is relatively higher than that of ethylene alpha-olefin copolymer which has high elastic modulus and stickiness. Moreover, its melt tension lends itself well to lamination, embossing, and take-off.

One of the important factors in the calendering process is to optimize the roll-banking condition, a condition well known to those skilled in the art. This is indicative of good melt-mixing of the resins. Usually high melt-tension requires a high molecular weight resin, but high molecular weight resins are not easily melted in roll mixing. For good banking conditions, a balance is needed between the melt-tension and melt-fusion.

The three-layer products comprise a backing fabric, a polyolefin-based foamed layer, and a polyolefin-based top-layer, the latter optionally coated with a primer and the primer with a top coating. The top skin layer and middle foam layer are made by a calendaring process, and then laminated to one another and the bottom fabric layer in any convenient order. Foaming is typically conducted after lamination in an oven typically maintained at 220° C. or higher for 30-120 seconds. The optional primer and PU top coating layers are then applied to the top skin layer of the laminated, three-layer structure.

Specific Embodiments

Materials

Propylene-ethylene copolymer: Density 0.870 g/cm³ (ASTM D792), MFR 2.0 g/10 min (ASTM D1238, at 230° C./2.16 Kg), Shore A=81 (ASTM D2240, 10 s), available from The Dow Chemical Company under the trademark VERSIFY™ 2400.

OBC: density 0.868 g/cm³ (ASTM D792), MFR 0.5 g/10 min (ASTM D1238, at 190° C./2.16 Kg), Shore A=45 (ASTM D2240, 10 s). It was made by essentially the same process in which commercially available products under the trade name INFUSE from The DOW Chemical Company are made (see Daniel J. Arriola, et al, Catalytic Production of Olefin Block Copolymers via Chain Shuttling Polymerization, SCIENCE, Vol 312, 5 May 2006, which is herein incorporated by reference).

DPO-BSA Molecular Melt, available from The Dow Chemical Company, with approximately 25 wt % BSA (4,4'-oxydibenzene-sulfonyl azide) and approximately 75 wt % IRGANOX™ 3114 (1,3,5-tris(3,5-di-tert-butyl-4-hydroxybenzyl)-1,3,5-triazine-2,4,6(1H,3H,5H)-trione).

Mineral oil: Hydrobrite™ 550 from Sonneborn.

Talc from Specialty Minerals Inc.

Zinc stearate (ZnSt) from SONGWON Chemical.

IRGANOX™ 3114 (1,3,5-tris(3,5-di-tert-butyl-4-hydroxybenzyl)-1,3,5-triazine-2,4,6(1H,3H,5H)-trione) from BASF.

IRGAFOS™ 168 (tris(2,4-di-(tert)-diphenylbutyl)phosphite) from BASF.

TINUVIN™ 622 (Butanedioc acid, dimethylester, polymer with 4-hydroxy-2,2,6,6-tetramethyl-1-piperidine ethanol) from BASF.

Sample Preparation and Testing

The following procedure is used to prepared the samples of the examples:

1. Grind MM into a fine powder.
2. Add the MM powder (300 ppm to 3000 ppm DPO-BSA) together with other ingredients to polymer pellets and tumble well.
3. Prepare compounds by using a Haake mixer (Polylab OS Rheo Drive 7) at about 140° C. for 5 minutes with rotor speed of 60 rpm (to prevent reaction of BSA), then cool down to room temperature.
4. Compression mold the compounds into 1 mm sheets at 140° C. for 3 minutes and then the temperature is ramped up to 220° C. for 1 minute and ramped down to room temperature.
5. Preform mechanical testing on the compression molded sheets.

The inventive and comparative compounds are prepared according to the formulations as listed in Table 1.

The testing methods are shown in Table 2.

Testing results of the formulated compounds are reported in Table 3.

TABLE 1

| | Formulated Compounds of the Top Layer of Artificial Leather | | | | | | | | |
|---|---|---|---|---|---|---|---|---|---|
| Example | PE Copolymer wt % | OBC wt % | Mineral Oil wt % | DPO-BSA ppm | Talc phr | ZnSt phr | Irganox 3114 phr | Irgafos 168 phr | Tinuvin 622 phr |
| CE-1 | 30 | 70 | 0 | 0 | 3.0 | 0.4 | 0.2 | 0.2 | 0.2 |
| 1 | 30 | 70 | 0 | 1500 | 3.0 | 0.4 | 0.2 | 0.2 | 0.2 |
| 2 | 30 | 70 | 0 | 3000 | 3.0 | 0.4 | 0.2 | 0.2 | 0.2 |

TABLE 1-continued

Formulated Compounds of the Top Layer of Artificial Leather

| Example | PE Copolymer wt % | OBC wt % | Mineral Oil wt % | DPO-BSA ppm | Talc phr | ZnSt phr | Irganox 3114 phr | Irgafos 168 phr | Tinuvin 622 phr |
|---|---|---|---|---|---|---|---|---|---|
| CE-2 | 40 | 48 | 12 | 0 | 3.0 | 0.4 | 0.2 | 0.2 | 0.2 |
| 3 | 40 | 48 | 12 | 1500 | 3.0 | 0.4 | 0.2 | 0.2 | 0.2 |
| 4 | 40 | 48 | 12 | 3000 | 3.0 | 0.4 | 0.2 | 0.2 | 0.2 |
| CE-3 | 40 | 35 | 25 | 0 | 3.0 | 0.4 | 0.2 | 0.2 | 0.2 |
| 5 | 40 | 35 | 25 | 1500 | 3.0 | 0.4 | 0.2 | 0.2 | 0.2 |
| 6 | 40 | 35 | 25 | 3000 | 3.0 | 0.4 | 0.2 | 0.2 | 0.2 |

CE = Comparative Example

TABLE 2

Testing Methods

| Property | Unit | Method | Test Condition |
|---|---|---|---|
| Hardness | Shore A | ASTMD-2240 | 10 s |
| MFR | g/10 min | ASTMD-1238 | 230° C./2.16 Kg |
| MI | g/10 min | ASTMD-1238 | 190° C./2.16 Kg |
| Tensile strength | MPa | D1708-06A (microtensile) | 500 mm/min |
| Ultimate Elongation | % | D1708-06A (microtensile) | 500 mm/min |
| Tensile Modulus, 100% secant | MPa | D1708-06A (microtensile) | 500 mm/min |
| Tensile Modulus, 300% secant | MPa | D1708-06A (microtensile) | 500 mm/min |
| Tear strength | kN/m | ASTMD624, type C | 500 mm/min |
| Abrasion Resistance | g | ASTMD-3884 | H18, 500 g, 1000 cycles |
| Adhesion Strength | Kgf/3 cm | ASTMD751 | CPP primer, PU top coating |
| QUV Colorfastness | Gray scale | Nike #G37 | 24 hours, 45 deg C. |
| Oven Aging | Gray scale | ASTMD573 + D-2000 | 120 hours, 70 deg C. |

A two-roll mill is used to evaluate processability by calendaring. The Thermo Scientific two-roll mill is controlled with temperature (150-160° C.), roll speed (6-10 rpm) and nip clearance (0.3-1.0 mm). For the evaluation, the compounds should: (1) not stick to the rolls at 155-160° C.; (2) have smooth banking; (3) be easily released from the roll; and (4) produce smooth/glossy sheet.

TABLE 3

A
Test Results

| Example | MFR g/10 min | Hardness Shore A | Tensile strength at BK MPa | Elongation at BK % | Modulus (Secant 100%) MPa | Modulus (Secant 300%) MPa |
|---|---|---|---|---|---|---|
| CE-1 | 1.7 | 52.3 | 8.15 | 1063.1 | 2.04 | 0.94 |
| 1 | 0.8 (after curing) | 57.0 | 11.21 | 1296.0 | 2.03 | 0.97 |
| 2 | 0 (after curing) | 63.1 | 11.96 | 1026.6 | 2.43 | 1.41 |
| CE-2 | 3.7 | 48.8 | 7.60 | 1087.7 | 1.48 | 0.74 |
| 3 | 2.8 (after curing) | 55.5 | 9.22 | 1166.7 | 1.64 | 0.82 |
| 4 | 0 (after curing) | 56.4 | 10.45 | 1167.3 | 1.79 | 0.94 |
| CE-3 | 9.6 | 42.4 | 6.63 | 1217.9 | 1.11 | 0.57 |
| 5 | 8.3 (after curing) | 42.9 | 7.05 | 1211.9 | 1.19 | 0.62 |
| 6 | 0.6 (after curing) | 43.7 | 8.21 | 1214.0 | 1.27 | 0.70 |

B
Test Results

| Example | Tear Strength KN/m | Abrasion g | Adhesion Kgf/3 cm | QUV Gray scale | Oven Aging Gray scale |
|---|---|---|---|---|---|
| CE-1 | 21.3 | 0.0355 | 3.5-4.0 | 5 | 5 |
| 1 | 23.1 | 0.0183 | 3.0-3.5 | 4-5 | 5 |
| 2 | 28.4 | 0.0156 | 2.5-3.0 | 4-5 | 5 |
| CE-2 | 16.6 | 0.0651 | 4.5-5.0 | 5 | 5 |
| 3 | 18.9 | 0.0538 | 4.0-4.5 | 4-5 | 5 |
| 4 | 20.3 | 0.0515 | 3.0-3.5 | 4-5 | 5 |
| CE-3 | 12.5 | 0.0977 | 4.0-4.5 | 5 | 5 |
| 5 | 12.4 | 0.0773 | 3.5-4.0 | 4-5 | 5 |
| 6 | 16.0 | 0.0680 | 2.0-2.5 | 4-5 | 5 |

As shown in Table 1 and Table 3, the comparative examples do not comprise DPO BSA. Comparative examples 1, 2 and 3 have 0%, 12% and 25% oil loadings, respectively. With increasing oil loading, softness of the compounds increases (from Shore A 52.3 to 42.4), but tensile strength, modulus, tear strength and abrasion resistance decrease dramatically.

For the inventive examples, DPO BSA is added with 1500 ppm or 3000 ppm. By incorporation of the coupling agent, tensile strength, tear strength and abrasion resistance are improved significantly. Crosslinking of the polymers by BSA results in an increase on Shore A hardness and a decrease on the adhesion strength, but the inventive examples afford balanced performance to meet Shore A of 40-60 and adhesion strength greater than (>) 2.5 Kgf/cm$^3$ for fashion bag applications. Moreover, the addition of DPO-BSA has little or no influence on the QUV and oven aging properties of the final compounds. The inventive examples passed the QUV test (require 4-5) and Oven Aging test (require 4-5). All the inventive formulations exhibit good processability for compounding and calendaring, which are prerequisites for production of the artificial leather on the conventional PVC calendaring line.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A top layer of an artificial leather multi-layer structure, the top layer made from a composition comprising (A) a propylene-alpha-olefin copolymer, (B) an olefin block copolymer (OBC), and (C) 4,4'-oxydibenzene sulfonylazide (DPO-BSA) molecular melt (MM).

2. The top layer of claim 1 in which the propylene-alpha-olefin copolymer comprises from 20 to 90 weight percent (wt %) of the composition, and the olefin block copolymer comprises from 20 to 90 wt % of the composition.

3. The top layer of claim 1 in which the DPO-BSA MM comprises at least 300 parts per million (ppm) of the composition.

4. The top layer of claim 3 in which the DPO-BSA MM comprises a coupling agent and antioxidant at a coupling agent to antioxidant mole ratio from 1:10 to 10:1.

5. The top layer of claim 3 further comprising at least one of a styrenic block interpolymer, a homogeneously branched ethylene/alpha-olefin interpolymer, and a random polypropylene interpolymer.

6. An artificial leather multi-layer structure comprising the top layer made from the composition of claim 1.

7. An article comprising the artificial leather multi-layer structure of claim 6.

8. The top layer of claim 1 comprising from 30 to 70 wt % of the propylene-alpha-olefin copolymer and from 30 to 70 wt % of the OBC.

9. The top layer of claim 1 comprising from 1500 to 3000 ppm of the DPO-BSA MM.

10. The top layer of claim 1 wherein the OBC is an ethylene/alpha-olefin multi-block interpolymer.

11. The top layer of claim 4 wherein the coupling agent comprises 4,4'-oxydibenzene-sulfonyl azide and the antioxidant comprises 1,3,5-tris(3,5-di-tert-butyl-4-hydroxybenzyl)-1,3,5-triazine-2,4,6-(1H,3H,5H)-trione.

12. The top layer of claim 1 further comprising mineral oil.

13. A process for making a composition, the process comprising the steps of:
   A. Dry blending (1) a DPO-BSA molecular melt (MM), (2) a propylene-alpha-olefin copolymer, and (3) an olefin block copolymer,
   B. Compounding the dry blend of (A) under a temperature at which the propylene-alpha-olefin copolymer and OBC are melted but the MM is not activated, and
   C. Activating the MM so as to initiate coupling/crosslinking of the propylene-ethylene copolymer and OBC.

14. The process of claim 13 in which the dry blend of (A) is compounded at a temperature from 130 to 150° C., and the MM is activated at a temperature in excess of 150° C.

* * * * *